(12) United States Patent
Gryaznov et al.

(10) Patent No.: US 6,748,534 B1
(45) Date of Patent: Jun. 8, 2004

(54) SYSTEM AND METHOD FOR PARTITIONED DISTRIBUTED SCANNING OF A LARGE DATASET FOR VIRUSES AND OTHER MALWARE

(75) Inventors: Dmitry O. Gryaznov, Portland, OR (US); Chengi Jimmy Kuo, Torrance, CA (US)

(73) Assignee: Networks Associates, Santa Clara, CA (US)

( * ) Notice: Subject to any disclaimer, the term of this patent is extended or adjusted under 35 U.S.C. 154(b) by 0 days.

(21) Appl. No.: 09/540,849

(22) Filed: Mar. 31, 2000

(51) Int. Cl.[7] .................. G06F 11/30; G06F 12/14; H04L 9/00; H04L 9/32

(52) U.S. Cl. .................. 713/188; 713/200; 713/201

(58) Field of Search .................. 713/188, 200, 713/201

(56) References Cited

U.S. PATENT DOCUMENTS 5,634,111 A * 5/1997 Oeda et al. .................. 711/153
6,021,510 A * 2/2000 Nachenberg .................. 714/38
6,401,210 B1 * 6/2002 Templeton .................. 713/200

OTHER PUBLICATIONS

Tim O'Leary Anti Virus Resources Happy99 Worm, http://www.alphalink.com.au/~oleary/Virus/happy99avp.htm; last updated:Jun. 18, 1999.*

* cited by examiner

Primary Examiner—Gilberto Barrón
Assistant Examiner—Cas Stulberger
(74) Attorney, Agent, or Firm—Patrick J.S. Inouye; Christopher J. Hamaty

(57) ABSTRACT

A system and a method for performing partitioned scanning of a dataset for malware in a distributed computing environment is disclosed. A dataset is maintained in a plurality of structured databases in the distributed computing environment. Each database stores a plurality of data item groups which each include a plurality of individual data items. Each such data item is uniquely identified within the dataset by a data item identifier. A set of indices is stored in a centralized database. The set of indices includes a list of scanned data item identifiers for each data item within the dataset scanned for malware and a list of last entry numbers for each data item group stored in each database. Each last entry number corresponds to one such data item within the data item group last scanned for malware. A plurality of malware scanners are executed in substantial concurrency. For each malware scanner, one such database and each such data item group within the selected database having data items not appearing in the list of last entry numbers are selected. Each such data item having a data item identifier not appearing in the list of scanned data item identifiers is obtained. Each such obtained data item is scanned for malware.

16 Claims, 6 Drawing Sheets

SYSTEM AND METHOD FOR PARTITIONED DISTRIBUTED SCANNING OF A LARGE DATASET FOR VIRUSES AND OTHER MALWARE

FIELD OF THE INVENTION

The present invention relates in general to scanning for viruses and other malware, and, in particular, to a system and method for performing partitioned scanning of a distributed dataset for viruses and other malware in a distributed computing environment.

BACKGROUND OF THE INVENTION

Information networks interconnecting a wide range of computational resources have become a mainstay of corporate enterprise computing environments. In general, most such environments consist of several host computer systems interconnected internally over an intranetwork to which individual workstations and network resources are connected. These intranetworks, also known as local area networks (LANs), make legacy databases and information resources widely available for access and utilization throughout the corporation and provide a means for retrieving, reading, and posting news messages. These same corporate resources can also be interconnected to wide area networks (WANs), including public information internetworks, such as the Internet, to enable internal users access to remote computational resources, such as the World Wide Web and Usenet Newsgroups, and to allow outside users to select corporate resources for the purpose of completing limited transactions or data transfer.

Most internetworks and intranetworks are based on a layered network model in which a stack of standardized protocol layers cooperatively exchange information between various systems. In particular, the Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated herein by reference, is the most widely adopted network model. Computer systems and network devices employing the TCP/IP suite implement a protocol stack, which includes a hierarchically structured set of protocol layers beginning with the link protocol layer and proceeding upwards to the network, transport, and application protocol layers. Each protocol layer performs a set of pre-defined functions as specified by the official TCP/IP standards set forth in applicable Requests for Comment (RFC).

TCP/IP computing environments in particular make a wide range of content and services available, including electronic mail, network news, and Web pages. Network news within the TCP/IP environment is popularly referred to as "InterNet News" or simply "Usenet," shorthand for the Usenet news system. The Usenet continues to be an area of sustained growth. Historically, the Usenet began as a set of mailing lists containing textual news messages sent to a group of subscribers. However, the Usenet now consists of over fifty thousand newsgroups, most of which receive a tremendous volume of news messages daily. Moreover, news messages now can contain non-textual content, such as raw or encoded binary data, and are potentially much larger in size than traditional textual news messages. In light of the sheer numbers of newsgroups and subscribers and individual news message sizes, centralized news servers have replaced the original mailing lists as an efficient approach to storing and retrieving messages for an anonymous audience.

The widespread usage of the Usenet has also been matched by an increased, albeit minority, presence of unauthorized content. Like electronic mail, news messages are an efficient and powerful medium for exchanging information that is widely available, easy to use, relatively fast, and flexible. These same advantages make news messages an attractive vehicle with which to introduce unauthorized content that includes computer viruses, Trojan horses, hoaxes, "Spam" mail, and other forms of "malware." Unauthorized content can be introduced, often surreptitiously, into a news message body, as an attachment, or even as Web content.

Even more than electronic mail, news messages are widely distributed to a multitude of computing environments, some of which may not be equipped with virus scanners. Moreover, the potential for widespread computer virus infection is particularly strong when combined with news message services. The most efficient method of combating malware is to scan every news message body before they are disseminated to individual users.

One prior art approach to scanning stored Usenet messages on a centralized news server is the Virus Patrol program, used by Network Associates, Inc., Santa Clara, Calif., as further described below with reference to FIG. 2. However, this approach is computationally constrained by a single process executing on a single server system. These inherent limitations prevent the program from scaling to meet the requirements of scanning a continually growing database with significant news message traffic for viruses and other malware. At some point, the sheer number of newsgroups and messages exceeds the capabilities of the program to scan and keep up with the message traffic.

Therefore, there is a need for a solution providing a distributed system for scanning a large dataset, including a news database. Such a solution would scale to provide the processing and bandwidth throughput required of a continually growing dataset. Preferably, the solution would provide concurrent processing with low bandwidth synchronization and high availability through a centralized database.

SUMMARY OF THE INVENTION

The present invention provides a system and method for concurrently scanning a large dataset for computer viruses and other forms of malware. The dataset is organized into a set of distributed databases each containing a plurality of groups storing individual data items. The data items are each uniquely identified by an identifier and can be included in a plurality of the groups. A plurality of malware servers cooperatively scan the groups for viruses and malware by using a commonly shared centralized database for tracking and synchronization. Scanned data items are tracked using a message identifier table and a last read table both maintained within the centralized database. The scanning of multiple part data items is synchronized using a threads table with the centralized database. Thus, the concurrent malware scanners can divide up the groups for concurrent processing in a highly scalable manner.

An embodiment of the present invention is a system and method for performing partitioned scanning of a dataset for malware in a distributed computing environment. A dataset is maintained in a plurality of structured databases in the distributed computing environment. Each database stores a plurality of data item groups which each include a plurality of individual data items. Each such data item is uniquely identified within the dataset by a data item identifier. A set of indices is stored in a centralized database. The set of indices includes a list of scanned data item identifiers for each data item within the dataset scanned for malware and a list of last entry numbers for each data item group stored in each database. Each last entry number corresponds to one such data item within the data item group last scanned for malware. A plurality of malware scanners are executed in substantial concurrency. For each malware scanner, one such database and each such data item group within the selected database having data items not appearing in the list of last entry numbers are selected. Each such data item having a data item identifier not appearing in the list of scanned data item identifiers is obtained. Each such obtained data item is scanned for malware.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
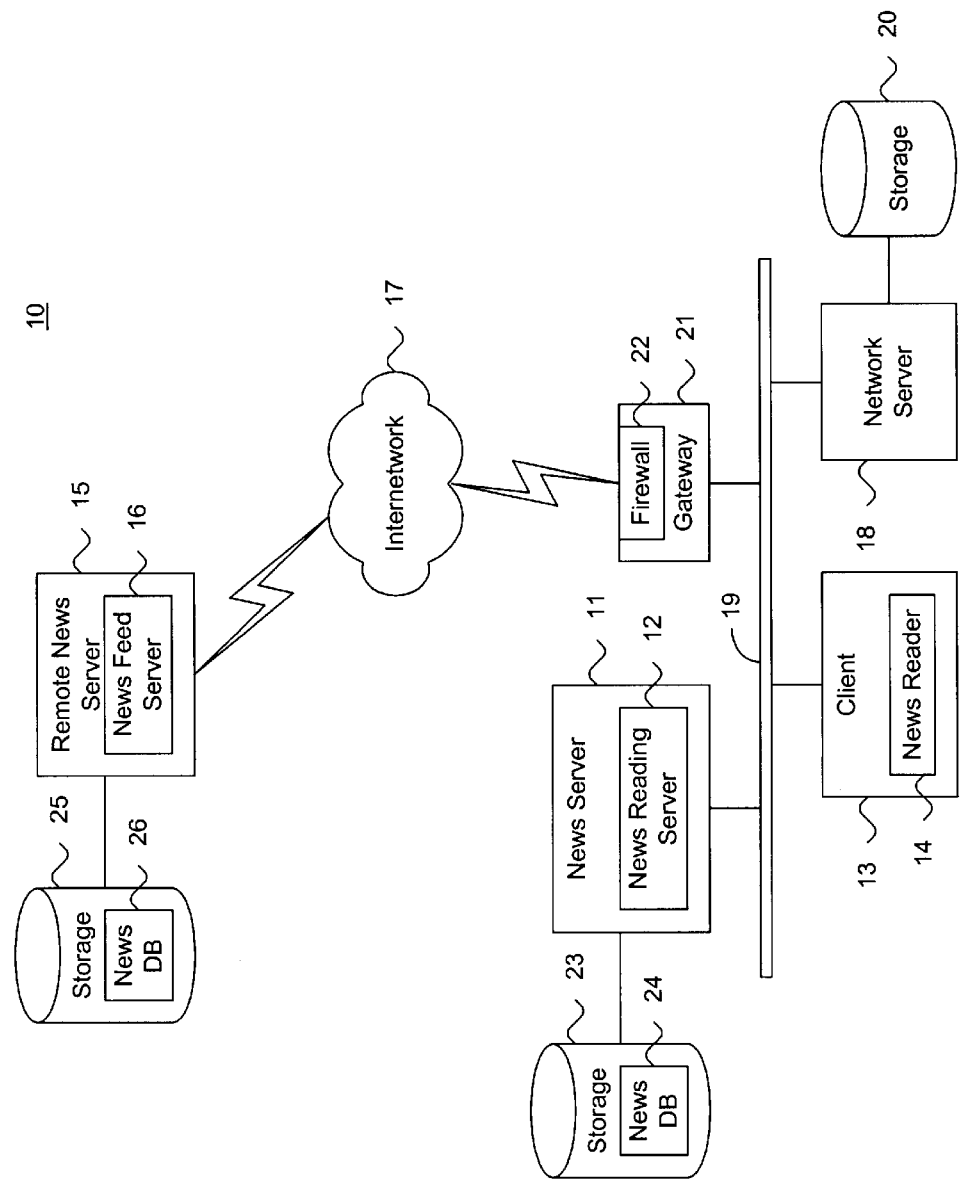
FIG. 1 is a functional block diagram showing a distributed computing environment within which a large news message dataset is shared.

FIG. 1 is a functional block diagram showing a distributed computing environment 10 within which a large news message dataset is shared. A news server 11 executes a news reading server 12 for providing news client services. Individual client systems 13 (only one client system is shown) can access, retrieve, and post news messages by executing a news reader 14. The news server 11 interoperatively communicates with at least one other remote news server 15 which executes a news feed server 16 for providing recently received news messages to the news server 11 and for receiving newly posted news messages from the news server 11. Both the news server 11 and remote news server 15 include storage devices 23 and 25 in which are respectively stored news databases 24 and 26. Although described as separate entities, the news reading server 12 and news feed server 16 could both be executed on the same server system.

The distributed computing environment 10 includes both a wide area internetwork 17, including the Internet, and a local area intranetwork 19. A network server 18 provides standard network host services to the news server 11 and client systems 13, such as access to a storage device 20, sharing of files and resources, and similar host functions to other computer systems on the intranetwork 19. Typically, these host services include serving Web pages, hosting electronic mail services, managing files, and the like. Other services and host configurations are feasible. The intranetwork 19 is interconnected to the internetwork 17 via a gateway 21, which includes a firewall 22 providing an initial layer of network security. The firewall 22 is principally directed at preventing unauthorized users from accessing the resources on the intranetwork 19. However, the firewall 22 does not ordinarily filter out unauthorized content. Rather, such content is most efficiently dealt with using virus scanners and similar applications executing on the individual client systems and various servers. Other network topologies, including various combinations of intranetworks and internetworks, are possible.

Unauthorized content includes computer viruses and malware and embraces basically any type of information or operation, usually unsolicited, which affects the integrity or operation of a computer system. Examples of unauthorized content include, non-exclusively, computer viruses, Trojan horses, hoaxes, and "Spam" mail. Computer viruses are self-replicating and consist of operations that may be in the form of a standalone application or as operations illicitly grafted onto an existing application. Trojan horses are forms of computer virus that do not self-replicate yet generally masquerade under the guise of a bona fide application, only to later possibly cause harm or data loss to the computer system into which the Trojan horse has been introduced. While computer viruses and Trojan horses can be destructive, hoaxes are applications that may not be harmful, but can cause interruptions, perhaps visual or audio, which interfere with productivity. Finally, Spam mail is unsolicited email, the electronic kin of conventional junk mail. Other forms of unauthorized content are feasible.

In the described embodiment, the news databases 24 and 26 are Usenet news databases. Each of the news feed servers 16 are configured as InterNetNews daemon (INND) servers which feed news messages between the various news servers 15. Each of the news reading servers 12 are configured as Network News Reading Protocol (NNRP) servers which interface with news readers 14 to provide news messages and receive postings. These news readers 14 communicate with the news reading servers 12 using the Network News Transfer Protocol (NNTP), such as described in W. R. Stevens, "TCP/IP Illustrated," Vol. 3, Ch. 15, Addison-Wesley (1996), the disclosure of which is incorporated herein by reference.

In addition, as described, the individual computer systems 11, 13, 15, 18 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
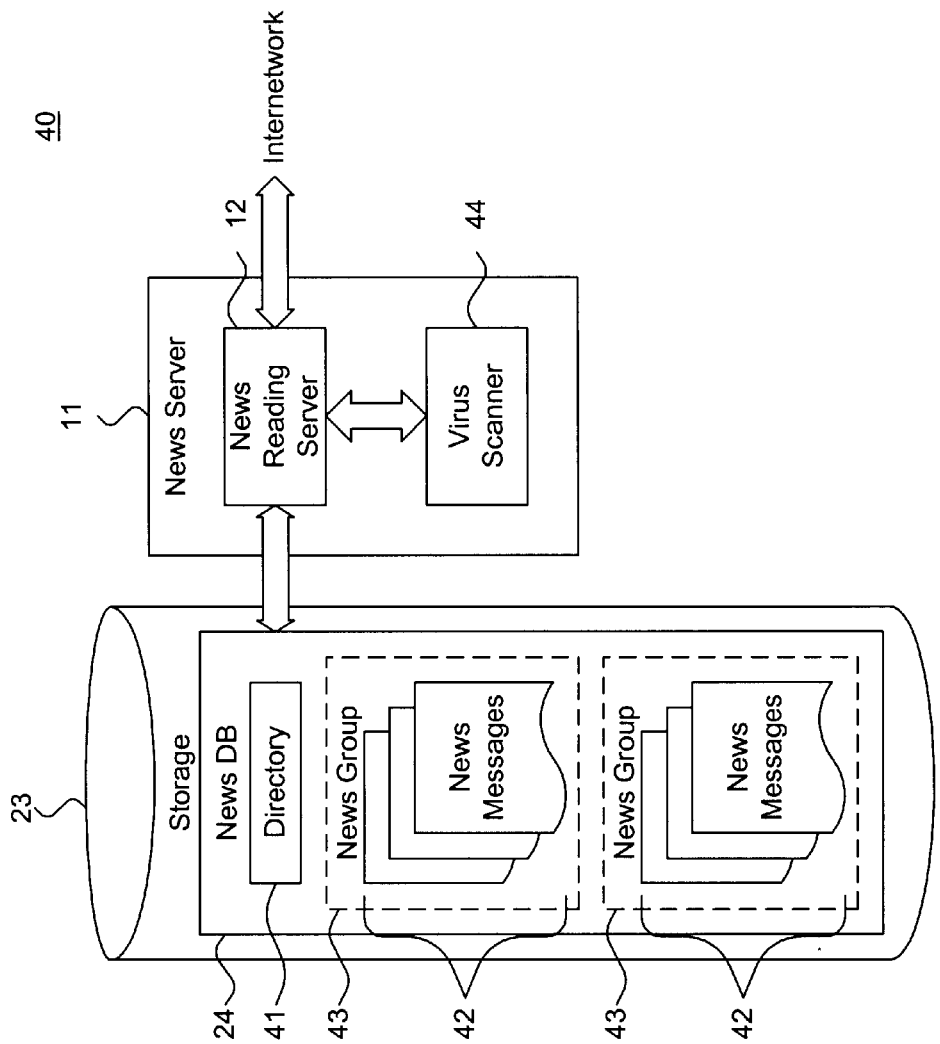
FIG. 2 is a block diagram showing a prior art system for scanning a large news message dataset for viruses and other malware.

FIG. 2 is a block diagram showing a prior art system 40 for scanning a large news message dataset for viruses and other malware. A virus scanner 44 operates as an adjunct to the news reading news server 12 with both operating on the news server 11, although the virus scanner 44 could equally operate on a separate system functioning as a remote client 13. The news reading server 12 receives new news messages from and sends newly posted news messages to the news feed server 16 (shown in FIG. 1). Thus, the news reading server 12 logically gains access to all of the Usenet news databases by operating as a client of the news feed server 16.

The news database 26 is a structured database storing news messages 42, preferably in a contiguous order. The news messages 42 are organized into newsgroups 43 containing other news messages presumably relating to the same general topic. Each news message 42 includes a header and a body for storing actual message content. The header stores message descriptive information and includes an identifier, known as a "Message ID," which uniquely identifies the news message, and a subject field describing the message contents. Some applications which generate news messages 42 also use the header to keep track of the individual parts of large files, particularly binary files, which have been broken up into multiple parts prior to posting. For example, a large data file named "HugeFile.zip" might be broken up into ten parts. The subject field would be defined to name the filename, part number, and total number of parts which would be indicated as "Subject: My Huge File—HugeFile.zip (1/10)." Other forms of news database organization could also be used.

Note that the same news message 42 can and often is posted to several newsgroups 43. The same Message ID is used for every newsgroup posting and are maintained in a directory 41 within the news database 26.

The virus scanner 44 scans the news database 24 for computer viruses, malware, and other forms of unauthorized content as potentially embedded in the header and body of individual news messages 42, in any attachments to the news messages 42, or in any Web content included in, such as Hypertext Markup Language (HTML) scripts, or referenced by the news messages 42. In addition, multi-part news messages 42 are downloaded and reconstructed prior to scanning. The virus scanner 44 operates as a news reader communicating with the news reading server 12 via NNTP commands. As well, the virus scanner 44 could also communicate with other news reading servers 12 via the internetwork 17 (shown in FIG. 1) by internally tracking news messages 42, newsgroups 43, and news servers 11.

While the prior art system 40 can effectively work to keep the news database 26 free of unauthorized content, the capacity of the single virus scanner 44 can quickly be exceeded when the size and rate of growth of the news database 26 outgrow the pace at which the news messages 42 can be scanned. At some point, the virus scanner 44 is no longer able to keep up and unscanned news messages 42 can become queued in the news database 26 for an indefinite time period while waiting for scanning.

Figure 3:
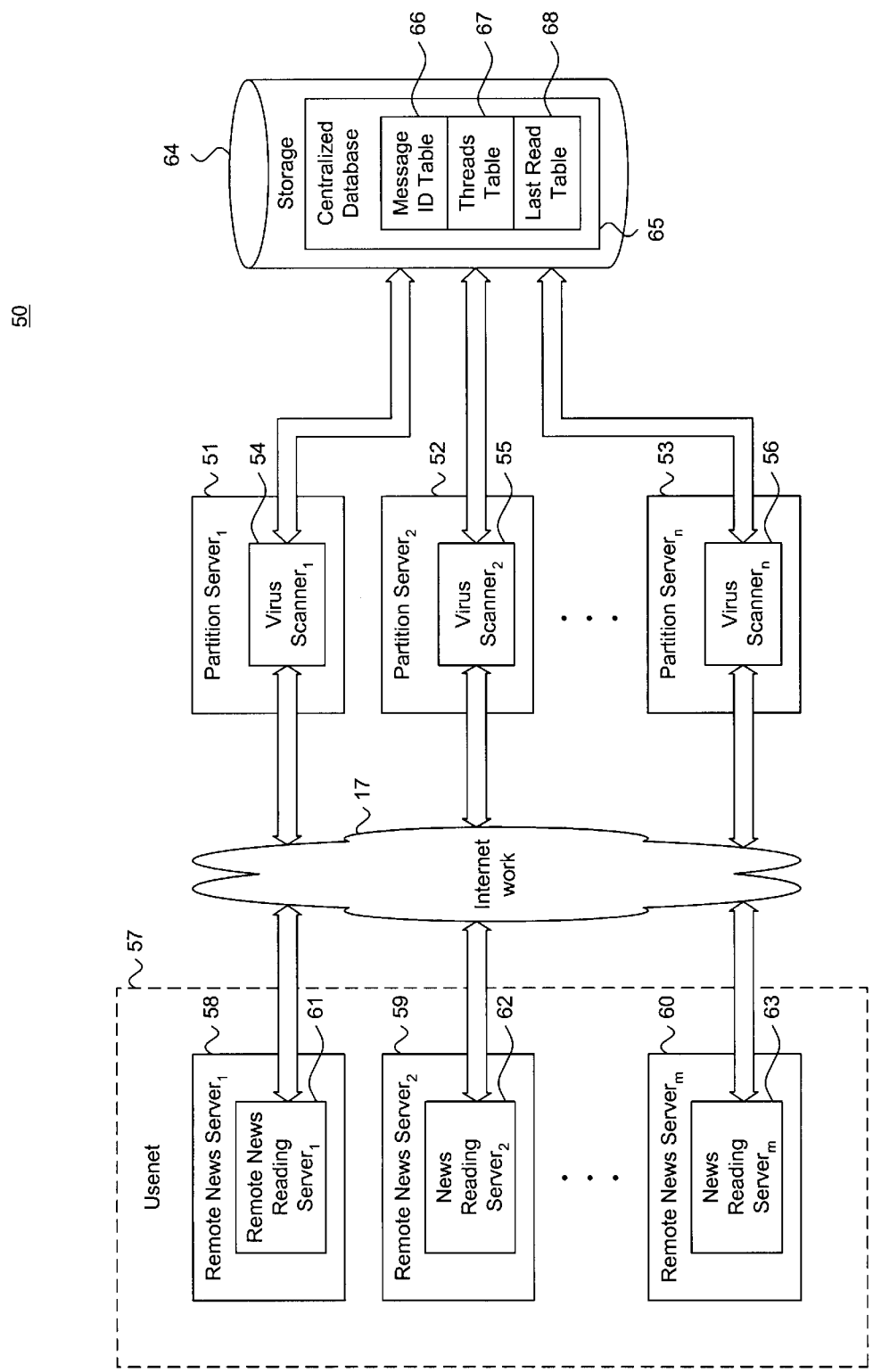
FIG. 3 is a block diagram showing a system for performing partitioned scanning of a large news message dataset for viruses and other malware in a distributed computing environment in accordance with the present invention.

FIG. 3 is a block diagram showing a system for performing partitioned scanning of a large news message dataset for viruses and other malware 50 in a distributed computing environment in accordance with the present invention. The system 50 consists of a plurality of partition servers 51, 52, 53 which each execute a virus scanner 54, 55, 56, respectively. The virus scanners 54, 55, 56 are implemented as computer programs written as source code in a conventional programming language, such as the C++ and Visual Basic programming languages, and presented for execution by the CPU as object or byte code, as is known in the art. The various implementations of the source code and object and byte codes can be held on a computer-readable storage medium or embodied on a transmission medium in a carrier wave. In the described embodiment, the software modules are preferably written in accordance with the Common Object Model (COM), such as described in D. Chappell, "Understanding ActiveX and OLE," Chs. 1–5, Microsoft Press (1996), the disclosure of which is incorporated herein by reference. The virus scanners 51, 52, 53 operate in accordance with a sequence of process steps, as further described below beginning with reference to FIGS. 4A–4C.

Essentially, each virus scanner 54, 55, 56 scans a dynamically definable partition of the news messages stored in the Usenet 57. As in the prior art system 40, each virus scanner 54, 55, 56 functions as a news reader communicating with news reading servers 61, 62, 63 operating on remote news servers 58, 59, 60 over the internetwork 17 via NNTP commands. The virus scanners 54, 55, 56 execute concurrently on the partition servers 51, 52, 53 as loosely-coupled parallel processes. Note that each virus scanner 54, 55, 56 need not be executed by a dedicated partition server 51, 52, 53, and multiple virus scanners 54, 55, 56 could operate on any individual or group of partition servers 51, 52, 53 to achieve load balancing and scalability.

The scanning performed by the virus scanners 54, 55, 56 is coordinated and synchronized by a set of three tables stored in a centralized database 65 maintained in a storage device 64 accessible by each of the partition servers 51, 52, 53. The tables include: message identifier (ID) table 66, threads table 67, and last read table 68. The message ID table 66 stores Message IDs for those news messages 42 (shown in FIG. 2) which have already been scanned by one of the virus scanners 54, 55, 56. Since each news message 42 has a unique ID, every news message 42 is only scanned once.

The threads table 67 implements a thread locking mechanism shared by the virus scanners 54, 55, 56. Each of the virus scanners 54, 55, 56 operate independently of each other and therefore create the potential for multiple virus scanners 54, 55, 56 attempting to scan different parts of the same multi-part news message. The threads table 67 locks any given thread of news messages 42 for access by the virus scanner 54, 55, 56 that first accesses that thread. Thus, every news message thread is only scanned once. Message threads are further described below with reference to FIGS. 4A–4C.

Finally, the last read table 68 keeps track of the last news message 42 processed by a virus scanner 54, 55, 56 by newsgroup 43 and news server 58, 59, 60. An article number is assigned to each news message 42 stored in each newsgroup 68 maintained by a given news server 58, 59, 60. The article number is different than the Message ID and is specific to the particular newsgroup 68 on a specific news server 58, 59, 60. The last read table 68 is organized to keep a running tally of article numbers so the individual virus scanners 54, 55, 56 can efficiently determine the next news message 42 to be scanned for any arbitrary newsgroup 43 on one of the news servers 58, 59, 60.

Figure 4A:
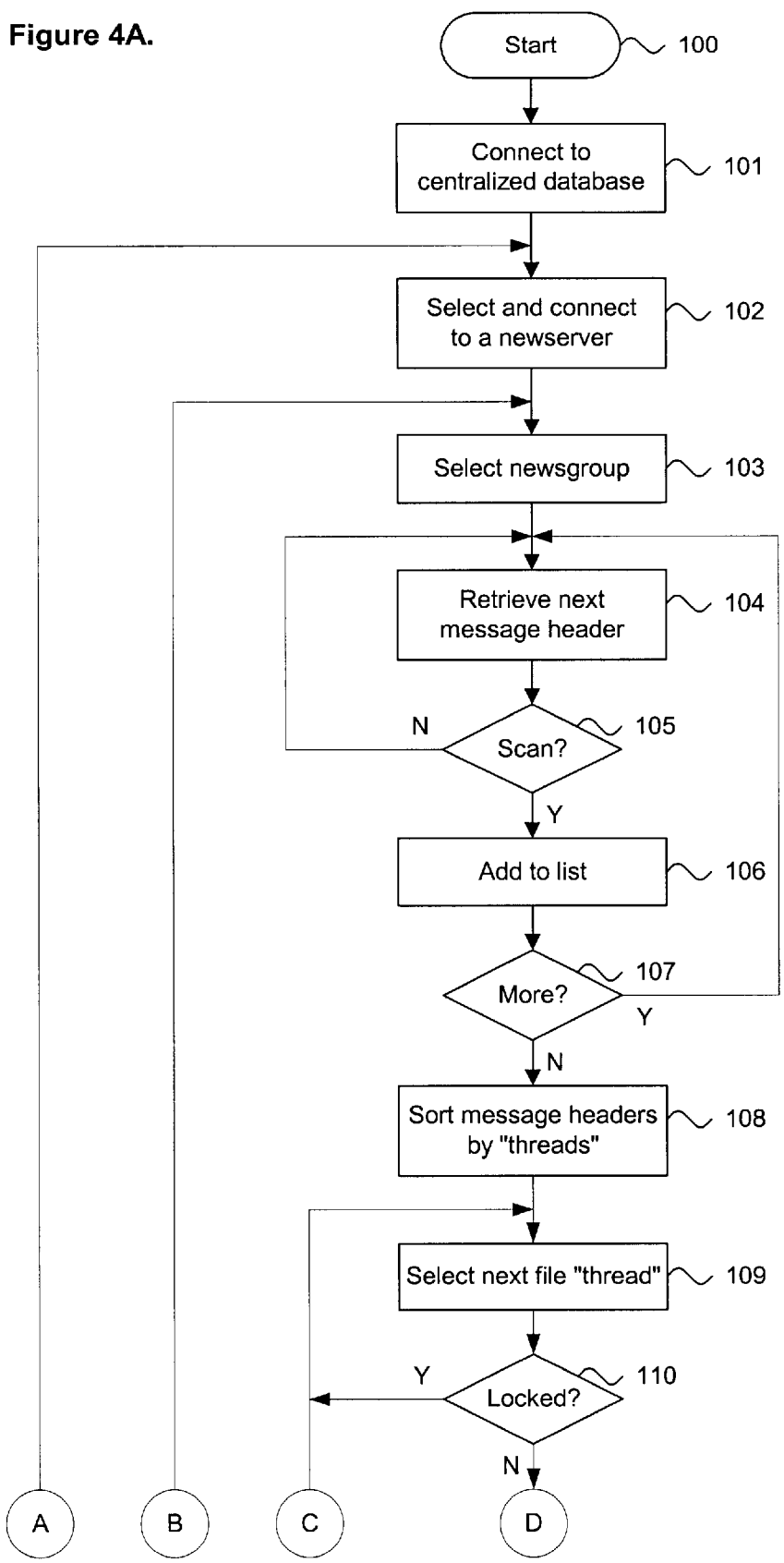
FIGS. 4A–4C are flow diagrams showing a method for performing partitioned scanning of a distributed dataset for viruses and other malware in a distributed computing environment in accordance with the present invention.
Figure 4B:
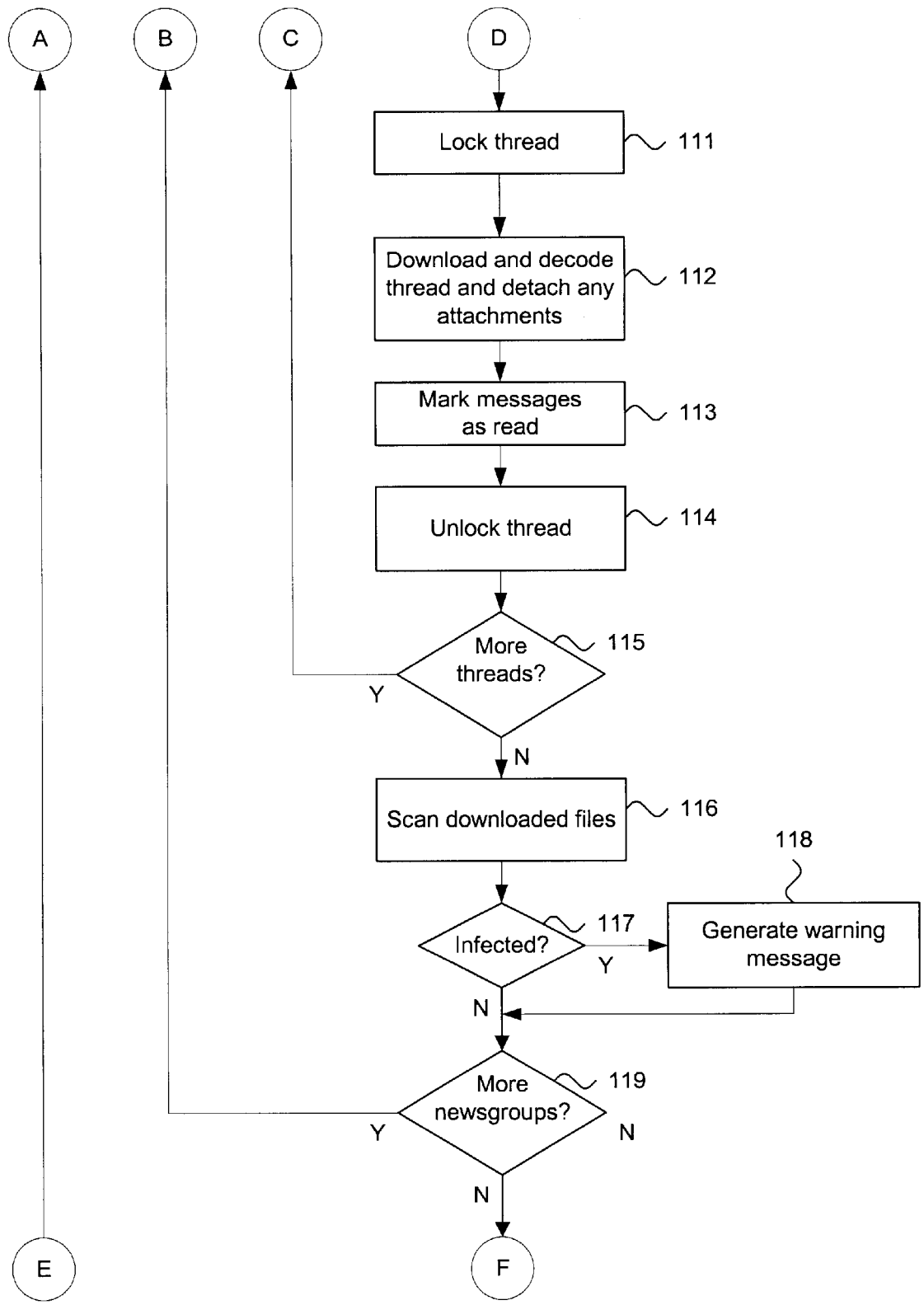
Figure 4C:
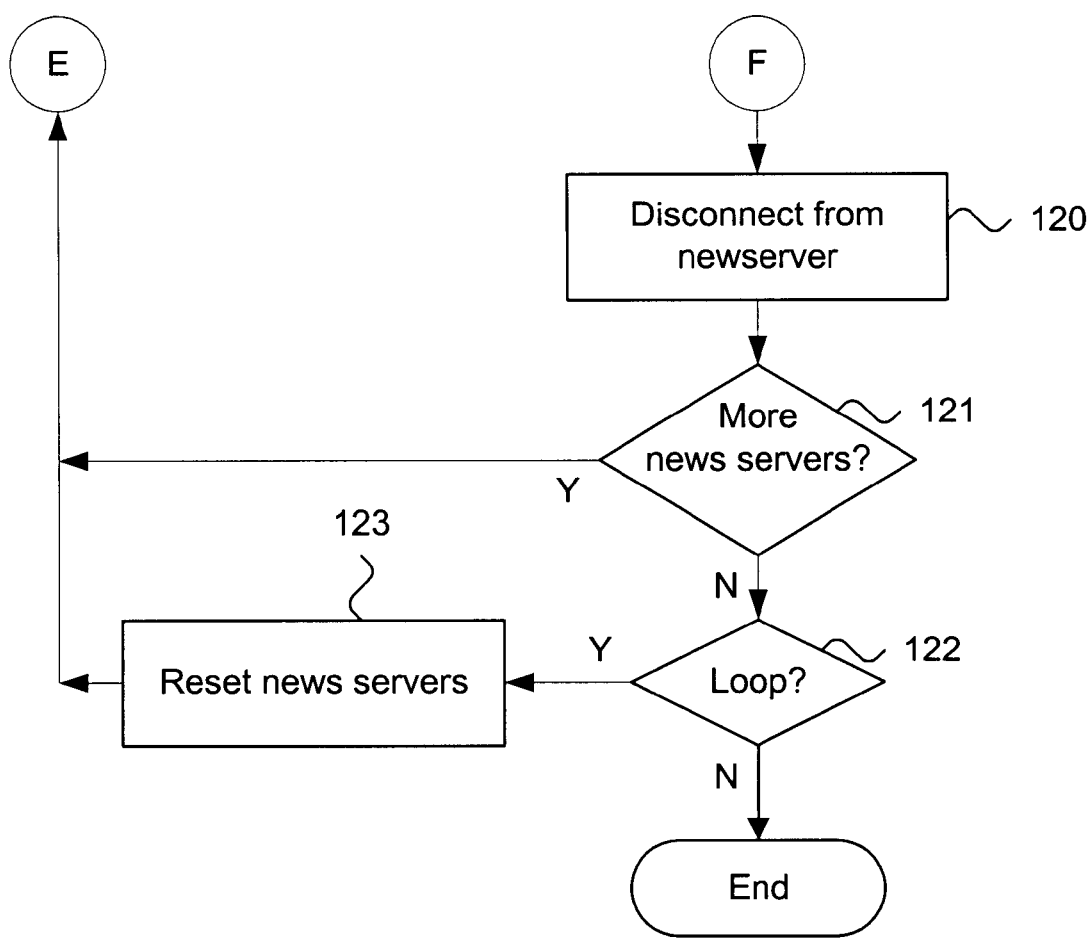

FIGS. 4A–4C are flow diagrams showing a method for performing partitioned scanning of a distributed dataset for viruses and other malware 100 in a distributed computing environment in accordance with the present invention. The method 100 is executed by each partition server 54, 55, 56 in a substantially concurrent manner. The partition servers 54, 55, 56 are synchronized through the tables in the centralized database 65. Thus, the partition servers 54, 55, 56 execute as asynchronous, loosely-coupled parallel processes. As described, the partition servers 54, 55, 56 execute on separate partition servers 51, 52, 53, although these servers could also execute as separate process instances on the same server system or as a combination of processors, process instances, and server systems.

For each partition server 54, 55, 56, the method 100 begins with the partition server establishing a connection to the centralized database 65. The various newsgroups 43 stored in the various news databases 24, 26 are then scanned for viruses and other forms of malware in a pair of nested iterative processing loops (blocks 102–120) as follows.

First, a news server 58, 59, 60 is selected and a connection established (block 102). A newsgroup 43 maintained by the selected news server 58, 59, 60 is selected (block 103). The header for the next news message 42 to be scanned is retrieved (block 104) by looking up the last read article number from the last read table 68 (shown in FIG. 3) for that newsgroup 43 and that news server 58, 59, 60. Only news messages 42 which have yet been read nor have expired are scanned. Thus, if the news message 42 can be scanned (block 105), the news message 42 is added to an internal list maintained by the virus scanner 54, 55, 56. If there are more news messages 42 left in the selected newsgroup 43 (block 107), the headers for each of the remaining news messages 42 are retrieved and added to the list (block 104–106).

Once all of the headers for the scannable news messages 42 in the selected newsgroup 43 have been retrieved (block 107), the message headers are sorted by "threads," that is, sequences of multiple parts which collectively make up a larger file. Each "thread" represents a scannable file. Thus, the next file "thread" is selected (block 109). The threads table 67 maintained in the centralized database 65 (shown in FIG. 3) is accessed to determine whether the current file thread is locked from access by other virus scanners 54, 55, 56. If the file thread is locked (block 110), another thread is selected (block 109). If the file thread is available, the file thread is locked (block 111) by adding an entry to the threads table 67.

Next, the body of the news message 42 is downloaded and decoded, if necessary (block 112). In addition, any attachments are detached from the news message 42. All of the news messages 42 which make up the selected file thread are marked as having been read (block 113) by updating the message ID table 66 and the last read table 68 and the file thread is unlocked (block 114). The sequence of selecting and locking a thread, downloading the thread, and updating the tables is repeated for each of the threads (block 115).

If all of the threads have been downloaded (block 115), the downloaded files are scanned for computer viruses and other malware (block 116) as is known in the art. If any of the downloaded files are infected (block 117), a warning message is generated (block 118). In the described embodiment, each virus scanner 54, 55, 56 maintains a log file and posts an appropriate warning to the affected newsgroups 43. In addition, a warning message is also sent to a specified list of addressees, including the administrator for the virus scanners 54, 55, 56.

If more news groups 43 on the news server 61, 62, 63 need to be scanned (block 119), iterative processing continues with the next newsgroup 43 (block 103). Otherwise, scanning of the selected newsgroup 43 is complete and the connection with the selected news server 61, 62, 63 is terminated (block 120). Similarly, if more news servers 61, 62, 63 potentially contain news messages 42 that need to be scanned (block 121), iterative processing continues with another news server 61, 62, 63 (block 102). Otherwise, there are further news servers 61, 62, 63 requiring processing. If the virus scanner 54, 55, 56 is configured to run indefinitely (block 122), the news servers 61, 62, 63 are reset (block 123) to restart processing from the beginning of the news groups 43 and iterative processing continues with a news server 61, 62, 63 (block 102). Otherwise, the method 100 ends.

Although the described embodiment has been set forth with reference to a network news message dataset, the present invention would also apply equally to other types of structured distributed datasets, particularly with respect to content downloadable in a distributed computing environment. These types of content include data obtained via the File Transfer Protocol (FTP) and Hypertext Transport Protocol (HTTP), but could also include mirrored file backups, data archives, and any other form of dataset in which logical groupings of data items and individual indices are maintained.

While the invention has been particularly shown and described as referenced to the embodiments thereof, those skilled in the art will understand that the foregoing and other changes in form and detail may be made therein without departing from the spirit and scope of the invention.

What is claimed is:

1. A system for performing partitioned scanning of a dataset for malware in a distributed computing environment, comprising:

a dataset maintained in a plurality of structured databases in the distributed computing environment, each database storing a plurality of data item groups which each comprise a plurality of individual data items, each such data item being uniquely identified within the dataset by a data item identifier, and comprising a header;

a set of indices stored in a centralized database and comprising:

a list of scanned data item identifiers for each data item within the dataset scanned for malware;

a list of last entry numbers for each data item group stored in each database, each last entry number corresponding to one such data item within the data item group last scanned for malware; and a list of locks for data item threads, each data item thread corresponding to a set of one or more data items each having a header indicating a grouping relationship; and a plurality of malware scanners executing in substantial concurrency and, for each malware scanner, comprising:

a malware scanner selecting one such database and each such data item group within the selected database having data items not appearing in the list of last entry numbers, obtaining each such data item having a data item identifier not appearing in the list of scanned data item identifiers, and scanning each such obtained data item for malware; and for each malware scanner, the malware scanner temporarily locking each data item thread using a data item thread lock while the each of the data items in the data item thread are scanned.

2. A system according to claim 1, further comprising:

for each malware scanner, the malware scanner downloading each of the data items in the data item thread before the data items are scanned.

3. A system according to claim 1, further comprising:

a plurality of partition servers within the distributed computing environment on which are executed the malware scanners.

4. A system according to claim 1, further comprising:

mirrored copies of the dataset maintained on a plurality of structured databases with each mirrored copy comprising substantially the same data item groups; and the centralized database synchronizing the index for each data item group over the mirrored dataset copies.

5. A system according to claim 1, wherein the dataset comprises NNTP-compliant news databases with each data item group comprising a newsgroup and each data item comprising a news message.

6. A system according to claim 1, wherein the malware comprises at least one form of unauthorized content selected from the group comprising a computer virus application, a Trojan horse application, and a hoax application.

7. A method for performing partitioned scanning of a dataset for malware in a distributed computing environment, comprising:

maintaining a dataset in a plurality of structured databases in the distributed computing environment, each database storing a plurality of data item groups which each comprise a plurality of individual data items, each such data item being uniquely identified within the dataset by a data item identifier, and comprising a header;

storing a set of indices in a centralized database comprising a list of scanned data item identifiers for each data item within the dataset scanned for malware and a list of last entry numbers for each data item group stored in each database, each last entry number corresponding to one such data item within the data item group last scanned for malware;

executing a plurality of malware scanners in substantial concurrency and, for each malware scanner, comprising:

selecting one such database and each such data item group within the selected database having data items not appearing in the list of last entry numbers;

obtaining each such data item having a data item identifier not appearing in the list of scanned data item identifiers; and scanning each such obtained data item for malware; and maintaining a list of locks for data item threads in the set of indices, each data item thread corresponding to a set of one or more data items each having a header indicating a grouping relationship; and for each malware scanner, temporarily locking each data item thread using a data item thread lock while the each of the data items in the data item thread are scanned.

8. A method according to claim 7, further comprising:

for each malware scanner, downloading each of the data items in the data item thread before the data items are scanned.

9. A method according to claim 7, further comprising:

executing the malware scanners on a plurality of partition servers within the distributed computing environment.

10. A method according to claim 7, further comprising:

maintaining mirrored copies of the dataset with each mirrored copy comprising substantially the same data item groups; and synchronizing the index for each data item group over the mirrored dataset copies.

11. A method according to claim 7, wherein the dataset comprises NNTP-compliant news databases with each data item group comprising a newsgroup and each data item comprising a news message.

12. A method according to claim 7, wherein the malware comprises at least one form of unauthorized content selected from the group comprising a computer virus application, a Trojan horse application, and a hoax application.

13. A computer-readable storage medium holding code for performing partitioned scanning of a dataset for malware in a distributed computing environment, comprising:

maintaining a dataset in a plurality of structured databases in the distributed computing environment, each database storing a plurality of data item groups which each comprise a plurality of individual data items, each such data item being uniquely identified within the dataset by a data item identifier, and comprising a header;

storing a set of indices in a centralized database comprising a list of scanned data item identifiers for each data item within the dataset scanned for malware and a list of last entry numbers for each data item group stored in each database, each last entry number corresponding to one such data item within the data item group last scanned for malware; and executing a plurality of malware scanners in substantial concurrency and, for each malware scanner, comprising:

selecting one such database and each such data item group within the selected database having data items not appearing in the list of last entry numbers;

obtaining each such data item having a data item identifier not appearing in the list of scanned data item identifiers; and scanning each such obtained data item for malware; and maintaining a list of locks for data item threads in the set of indices, each data item thread corresponding to a set of one or more data items each having a header indicating a grouping relationship; and for each malware scanner, temporarily locking each data item thread using a data item thread lock while the each of the data items in the data item thread are scanned.

14. A storage medium according to claim 13, further comprising:

for each malware scanner, downloading each of the data items in the data item thread before the data items are scanned.

15. A storage medium according to claim 13, further comprising:

executing the malware scanners on a plurality of partition servers within the distributed computing environment.

16. A storage medium according to claim 13, further comprising:

maintaining mirrored copies of the dataset with each mirrored copy comprising substantially the same data item groups; and synchronizing the index for each data item group over the mirrored dataset copies.

* * * * *